Feb. 15, 1927.
J. A. KALEY
1,618,091
PARING MACHINE
Filed Jan. 22, 1926   2 Sheets-Sheet 1
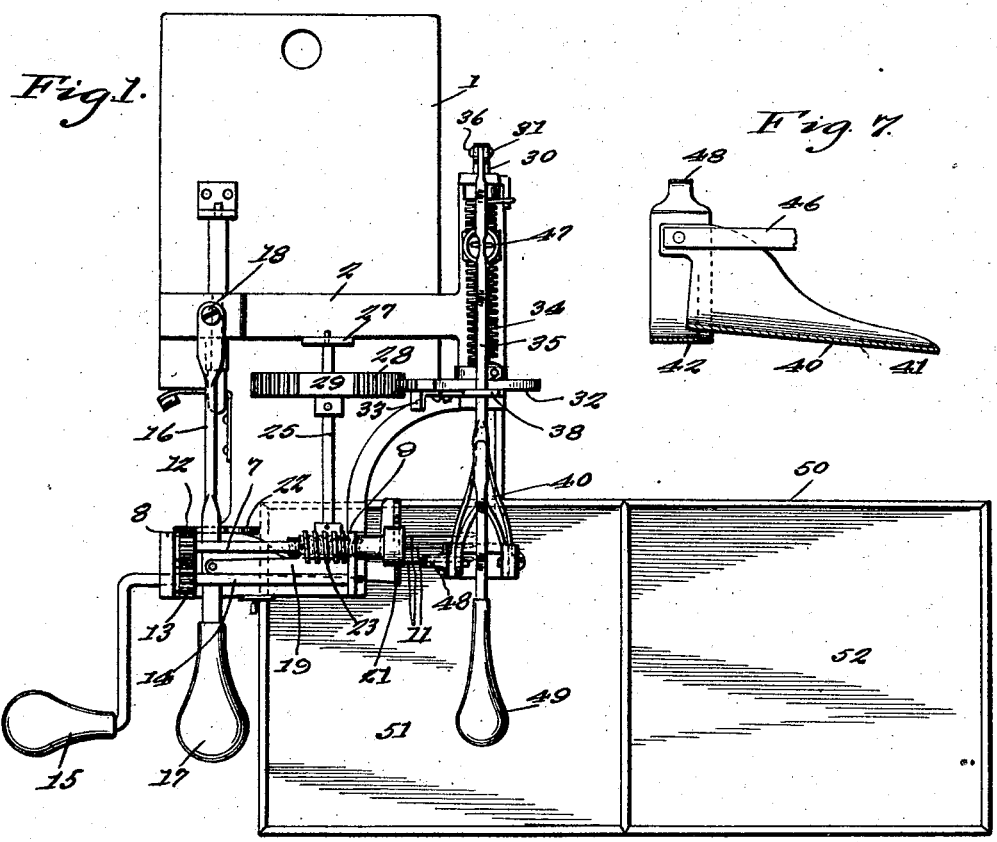
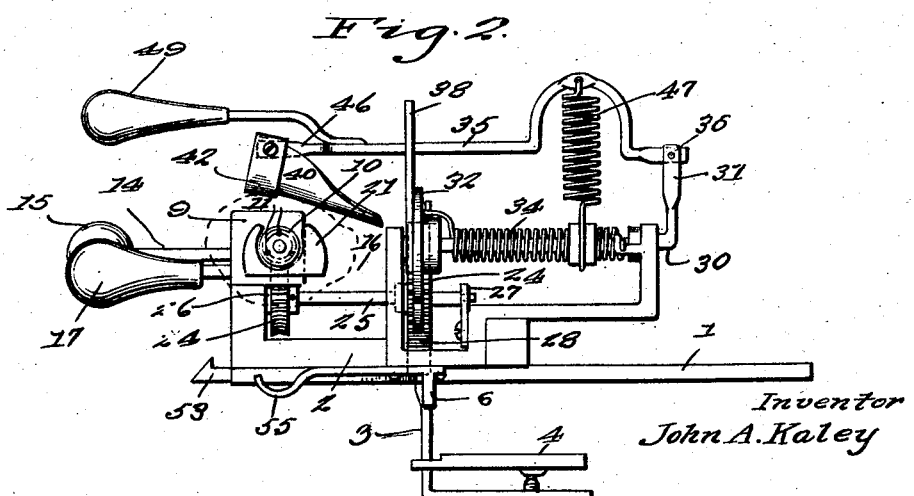
Inventor
John A. Kaley
By Spear, Middleton, Donaldson, Hall
Attorney

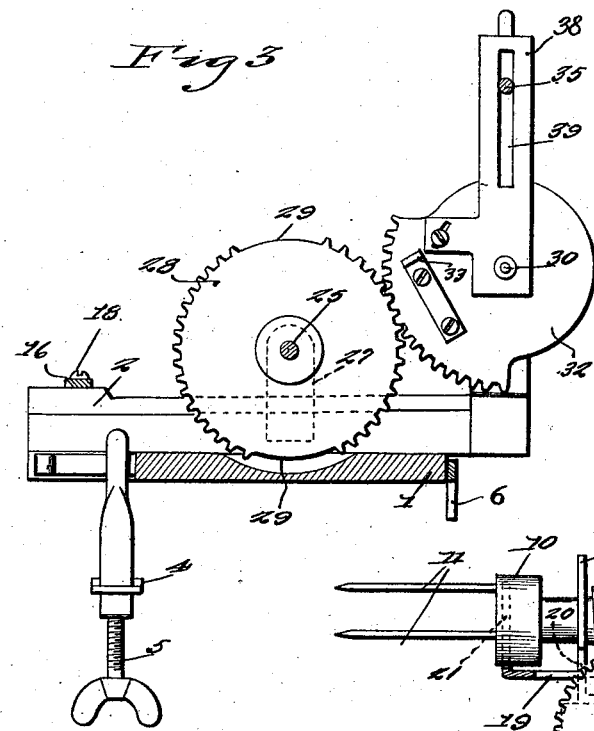
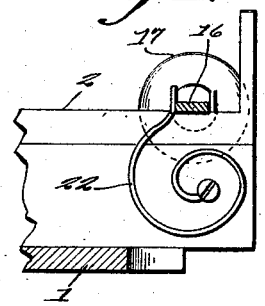
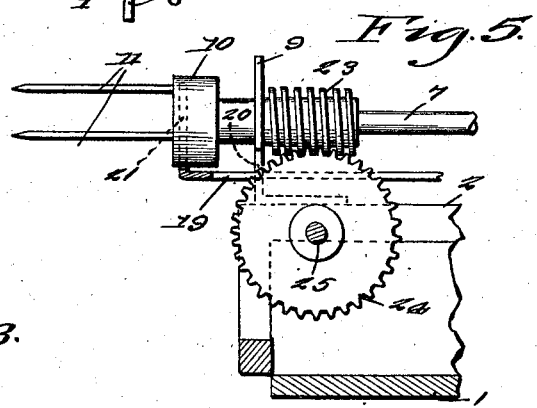
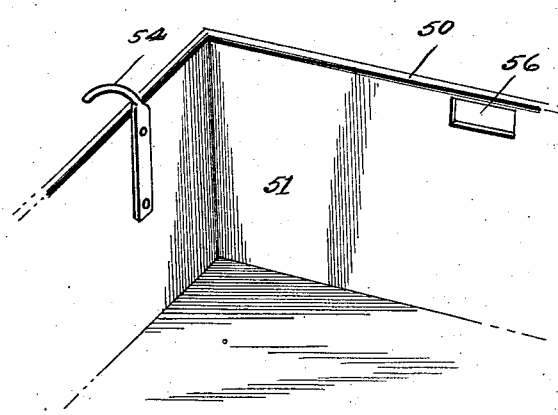
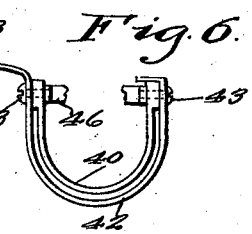

Patented Feb. 15, 1927.

1,618,091

UNITED STATES PATENT OFFICE.

JOHN ANDREW KALEY, OF ELYRIA, OHIO.

PARING MACHINE.

Application filed January 22, 1926. Serial No. 83,051.

My present invention relates to a peeling or paring machine, and more particularly to that type of device which is applicable to the paring of potatoes, apples, pears and the like.

The principal object of the invention is the provision of means, as above, which may be used efficiently to pare articles having an uneven exterior such as a potato.

It is well understood that an apple or pear presents no real difficulties in machine paring, because of the regularity of its surface, but it is extremely difficult in the case of a potato to find means which may adapt themselves to the irregularities, the hills and the valleys, and to evenly remove the skin from the same in an efficient manner.

To this end the invention includes means for rotating an article such as a potato, apple, pear or the like, and the provision of a knife which is also adapted to rotate about an axis of rotation of the article to be pared, and at a point midway of the ends of said article. The knife operating mechanism is so arranged as to permit of the rotation through an arc of a half circle, or slightly less, and also so arranged that after having completed its arcuate movement, it is automatically returned to its starting point.

The knife or blade of the invention comprises a knife proper to which is affixed a feeler or antenna, the whole structure being hinged on a blade carrying arm so that the feeler may go ahead of the knife and guide the latter over the hills and into the valleys of the irregular article being pared, so that the entire surface of the article will be covered by the blade or knife.

The invention further consists in the particular arrangement, structure and combination of parts herein shown and described.

I have illustrated in the accompanying drawings one embodiment of the invention which I have found to be satisfactory, although obviously many forms may be constructed within the spirit of the invention.

In these drawings:—

Figure 1 is a plan view of one embodiment of my invention.

Fig. 2 is a side elevation of the device of Fig. 1.

Fig. 3 is an elevation partly in section of the mutilated gears.

Fig. 4 is a detail, partly in section, of the ejector device.

Fig. 5 is an elevation, partly in section, showing the article holding forks.

Fig. 6 is a front view of the knife.

Fig. 7 is a side elevation, partly in section, of the knife.

Fig. 8 is a perspective view of the article receptacle.

Referring now with particularity to the embodiment illustrated, I have shown a base at 1 which may be of any desired material, upon which the upper structure or framework may be mounted. Upon the base I find it convenient to mount a casting, as at 2, which contains the bearings for the various parts, as will be more fully described hereinafter.

At 3 I have illustrated a clamp rod secured to the base 1 and extending downwardly and over the same, terminating in the movable element 4 which can be made to approach the base under action of the wing screw 5, in the ordinary manner. It will thus be seen that the base and the structure thereon may be clamped onto the edge of a table, shelf or other convenient structure when the device is in use. The base is also provided with a projecting lug 6 which is also adapted to engage the edge of the table, shelf or structure to which the device is attached so that the same is rigidly mounted and will not slip or rotate on the support to which it is affixed, particularly when the peeled article is ejected from the fork.

The article rotating mechanism may comprise a shaft 7 mounted in bearings 8 and 9 at two points on the said shaft, one end of said shaft terminating in a mounting 10 having prongs or forks 11 adapted to be inserted in the article to be pared. The end of the shaft opposite the prongs or forks 11 is provided with a gear 12 secured on the shaft 7, which meshes with a similar gear 13 carried by a drive shaft 14, also mounted in the bearings 8 and 9. The shaft 14 terminates in a handle 15, rotation of which causes, through the instrumentalities of gears 13 and 12, rotation of any article impaled on the prongs or forks 11.

It has been found desirable to provide ejecting means for the article carried by the forks 11 so that the same may be quickly removed from the device after paring. Such means I have shown to consist of an actuating rod 16 having a handle 17 thereon conveniently located, the other end of the rod 16 being pivoted, as at 18, to a portion of the casting 2. Pivoted to the actuating rod 16 is a slide 19 extending through a slot 20 in the bearing 9, which slide terminates on the other side of the bearing 9 in a fixture 21 which encircles or partially encircles the base of the forks 11. It will now be seen that when the article impaled on the forks has been completely operated upon, movement to the right of the handle 17 will cause the article to be ejected or removed from the forks 11. A spring 22 on the article side of the rod 16 causes the rod and associated mechanism to return to its original position ready for another ejection.

The knife or blade driving mechanism is shown to consist of a worm 23 mounted on the shaft 7 which meshes with a gear 24 fixed on a shaft 25 mounted for rotation in bearings 26 and 27 carried by the casting 2. Upon the other end of the shaft 25 is mounted drive gear 28 having its teeth removed to form two toothless segments, indicated generally at 29.

Mounted upon two upstanding portions of the casting 2 is a shaft 30, one end of which is bent to form an arcuate portion the end of which terminates in a yoke 31 for a purpose to be more fully described hereinafter. Upon the other end of the shaft 30 is fixedly mounted a segmental gear 32 the teeth of which are of an extent equal to the number of teeth between the toothless segments 29 of the drive gear 28. It will also be noted that the distance between the axis of rotation of the segmental gear 32 and the edge of its teeth is substantially equal to that of the drive gear 28 so that when either of the toothless segments 29 of the drive gear 28 are presented to the segmental gear 32, the latter may be freely rotated without touching the drive gear 28. The purpose of this will be more fully described later. Upon the side of the segmental gear 32 I mount a stop 33 which is adapted to engage with the side of the upstanding portion of the casting 2 which serves as a bearing for the shaft 30. Encircling the shaft 30 I provide a coil spring 34 its ends being fixed so that the tendency of the spring in uncoiling is to rotate the shaft 30 encircled by the spring, and the mechanism attached to this shaft, in a counter-clockwise direction. The counter-clockwise rotation of the mechanism is limited by reason of the fact that when it gets to a certain point, the stop 33 engages the side of the upstanding portion of the casting 2. The mutilated gear and associated parts in normal operation, of course tend to coil the spring and increase its tension.

The knife carrying mechanism may satisfactorily consist of a rod 35, one end of which is held between the yoke 31 of the shaft 30 by means of a pin 36. The rod 35 extends through a slot in a guiding member 38 secured to the segmental gear 31, the slot 39 extending in a direction parallel with the plane of the shaft 30, as will be clearly seen from the drawings.

The knife proper consists of an antenna or feeler 40, one end of said member being reduced or narrowed, as at 41. Attached to the large end of the feeler 40 is the sharpened knife or blade 42, as by means of bolts 43, the blade 42 being spaced from the feeler 40. It will be apparent that the ends of the bolts 43 are socketed in corresponding apertures in a yoke 46 carried by the end of the rod 35 in the knife carrying mechanism so that the blade and attached feeler is free to rotate about the bolts 43 as an axis. A coil spring 47 engaging the shaft 30 and the rod 35, tends to keep the rod 35 of the knife carrying mechanism at the bottom of the slot 39 in the guiding member 38. Inasmuch as the knife directly overlies the article impaled on the forks 11, it will be seen that the spring 47 maintains contact between the blade 42 and the article being operated upon.

The operation of the device is as follows:—

The article being impaled on the prongs or forks 11, the handle 15 is rotated, the blade bearing against the article impaled on the forks 11 at an extreme left hand position. Rotation of the handle 15 in a clockwise direction will cause opposite rotation of the article impaled on the forks 11. Upon continued rotation of the handle 15, it will be noted that through the associated mechanism, the teeth of the drive gear 28 will engage the teeth of the segmental gear 32, causing a clockwise movement of the segmental gear 32 and, therefore, of the knife or blade 42 and its associated mechanism. This action is continued until the segmental gear 32 has traveled through all of the teeth in one of the segments of the drive gear 28. At this point it will be apparent that the knife or blade has traveled from the extreme left hand of the article impaled on the forks 11 to the extreme right hand. As the article itself also rotates during this movement, it will be clear that every portion of the surface of the article has been presented to the knife, which has completely pared or removed the skin therefrom.

When the blade is in its extreme right hand position, the last teeth on the segmental gear 32 engaging the last teeth on the drive gear 28, the next movement in the same direction of the drive gear 28 will cause a disengagement of the last teeth of these two members, and under action of the coil spring 34 the entire knife carrying mechanism will rotate counter-clockwise until its initial position has been reached. The handle 17 on the ejecting means may be thrust to the right, thereby ejecting the pared article, and a fresh article may be then inserted on the prongs or forks 11 and the operation repeated as often as desired.

A hook 48 formed as a continuation of the knife blade, serves to hold the entire knife structure back from the holding fork so that a fresh article may be impaled thereon without the knife getting in the way.

In peeling extra long potatoes, the handle 49 may be grasped and the outward or right hand movement of the knife assisted manually.

In order to keep both parings and potatoes from falling to the floor, I provide a pan 50 having compartments 51 and 52, for peelings and peeled potatoes respectively. The pan 50 is attached to the device by first inserting catch 53 located beneath the ejecting handle, through the supplemental hook 54 secured to the pan, and then hanging the pan to the device by inserting the side hook 55 through the aperture 56 in the side of the pan. The pan will thus hang where it will naturally catch the peelings and potatoes in the proper compartments.

It is necessary, in order to completely understand the invention, that great stress be laid on certain points as contributing to the successful and efficient operation of the device of this invention. The most important feature is that of the blade or knife 42 which is hinged or mounted for partial rotation on the end of the rod 35. This pivotal movement in connection with the feeler 40, allows the latter to travel ahead of the knife into the hollows, and over the hills of the irregular article, such as a potato, so that the knife or blade 42 directly follows the feeler into these locations, which would not be true were the knife rigid and the hinge and the feeler omitted. It will readily be understood that in the case of an article having a regular periphery, such as a pear or an apple, a fixed knife might be used, but in operating upon a potato, it will also be apparent that without the instrumentalities above mentioned, it would not be possible for the knife to dip down into the hollows and then pass up over the hills adjacent thereto without missing the hollows and removing a considerable portion of the hills, unless the antenna or feeler 40 guided the blade 42 in this action.

Another very important part of the invention resides in the fact that the prongs or forks 11 are so arranged that the operator may place the article thereon with his right hand. It is imperative at the outset to see that the article is properly and advantageously fixed on the forks 11. Obviously this cannot be done as efficiently with one's left hand as with the right. On the other hand, a mere rotation of the handle 15 may be efficiently accomplished with either hand, so that I have arranged the important function of placing the article on the prongs in a position so that it can be done with the right hand, and left the more unimportant function of mere rotation of the handle 15 for the less efficient left hand.

It is to be noted that at the end of the knife blade opposite the hook a small crook is provided in the blade. This is the knife set. Without this the knife would always have to be adjusted. With it, it keeps the knife in adjustment.

Having thus described my invention, what I claim is:—

1. In combination, means to hold and rotate an article to be pared, means associated therewith to pare an article so held, including a knife carrying element, a knife pivoted thereto, the pivot of said knife being parallel to the axis of rotation of the article holding means.

2. A device of the character described, comprising a driven shaft, a hinged knife movable with said driven shaft, said driven shaft carrying a segmental gear, and means to actuate said gear.

3. A device of the character described, comprising a driven shaft, an intermediate shaft carrying a mutilated gear meshing with a segmental gear mounted on said driven shaft, and a hinged knife movable with said driven shaft.

4. A device of the character described, comprising a driven shaft, an intermediate shaft carrying a mutilated gear having spaced toothed segments thereon, a segmental gear carried by the driven shaft and meshing with said mutilated gear, and means to cause movement of said driven shaft reverse to that of the intermediate shaft when the untoothed segments of the mutilated gear are presented to the teeth of the segmental gear, and a knife movable with said driven shaft.

5. A device of the character described, comprising a driven shaft, a knife carried by an element pivoted to said driven shaft, and a guide member rotatable with the driven shaft permitting limited movement of the knife carrying element about its pivot.

6. A device of the character described, comprising a driven shaft, an intermediate shaft carrying an intermittently toothed gear, a gear segment carried by the driven shaft and engaged by said intermittently toothed gear, a pivoted knife shaft carried by the driven shaft, a hinged knife including an antenna carried by the knife shaft, means to rotate said driven shaft in a direction reverse to that movement caused by the intermediate shaft, an article impaling fork carried by the drive shaft, means to eject an article impaled on said fork, an extension of the driven shaft intersecting the impaled article at substantially the juncture of its three axes, and means to maintain contact between said knife and an article impaled on said fork.

In testimony whereof, I affix my signature.

JOHN ANDREW KALEY.